United States Patent [19]
Seki

[11] Patent Number: 5,923,389
[45] Date of Patent: Jul. 13, 1999

[54] PLASMA ADDRESSED ELECTRO-OPTICAL DISPLAY

[75] Inventor: Atsushi Seki, Kanagawa, Japan

[73] Assignee: Sony Corporation, Tokyo, Japan

[21] Appl. No.: 08/986,524

[22] Filed: Dec. 8, 1997

[30] Foreign Application Priority Data

Dec. 9, 1996 [JP] Japan ................................ 8-328938

[51] Int. Cl.$^6$ .................... G02F 1/133; G02F 1/1345; H01J 17/49; G02G 3/28
[52] U.S. Cl. .................. 349/32; 349/152; 313/583; 345/60
[58] Field of Search ................ 349/32, 152; 313/582, 313/583; 345/60

[56] References Cited

U.S. PATENT DOCUMENTS

| | | | |
|---|---|---|---|
| 5,596,431 | 1/1997 | Bongaerts et al. | 349/32 |
| 5,674,553 | 10/1997 | Shinoda et al. | 427/68 |
| 5,698,944 | 12/1997 | Togawa | 313/582 |
| 5,719,652 | 2/1998 | Hayashi | 349/122 |
| 5,821,912 | 10/1998 | Miyazaki | 349/58 |

Primary Examiner—Tiep H. Nguyen

[57] ABSTRACT

A plasma addressed electro-optical display which is capable of formation of amalgams in the terminal electrodes to elongate the lifetime of the plasma addressed electro-optical display. The plasma addressed electro-optical display according to the present invention includes a first substrate having a plurality of discharge electrodes formed thereon; a dielectric layer disposed apart from the first substrate for a predetermined distance; a plasma cell formed by sealing the peripheries of the first substrate and the dielectric layer with a sealing portion; and a second substrate disposed opposite to the dielectric layer and having data electrodes intersecting the discharge electrodes on the surface thereof, wherein the plasma cell and the second substrate are stacked in such a manner that an electro-optical material layer is interposed between the plasma cell and the second substrate so that the plasma addressed electro-optical display is formed, the discharge electrodes are connected to terminal electrodes through connecting electric lines, and the terminal electrodes are drawn out to the outside of the plasma cell, and then connected to a drive circuit.

6 Claims, 6 Drawing Sheets

PLASMA ADDRESSED ELECTRO-OPTICAL DISPLAY

BACKGROUND OF THE INVENTION

1. Field of the Invention

The present invention relates to an image display (a so-called plasma addressed electro-optical display) using plasma whereby to activate an electro-optical material layer so as to display an image.

2. Description of Prior Art

The resolution and contrast of a liquid-crystal type display unit have been improved by, for example, a so-called active matrix addressing method, in which an active device, such as a transistor, is provided for each display pixel and the active devices are operated.

The foregoing method, however, must use a multiplicity of semiconductor devices, such as thin-film transistors, thus causing a problem of unsatisfactory low manufacturing yield to arise when a display having a large area is manufactured. Thus, there arises a problem in that the cost cannot be reduced.

To solve the foregoing problem, a method has been suggested which employs discharge plasma as active devices in place of the semiconductor devices, such as MOS transistors and thin-film transistors.

An image display apparatus (hereinafter called a "plasma addressed electro-optical display") has a stacked structure composed of a liquid crystal layer, which is an electro-optical material layer, and a plasma cell, in which plasma discharge takes place. A thin and dielectric-material plate made of glass and the like is disposed between the liquid crystal layer and the plasma cell.

The plasma addressed electro-optical display has a structure that the plasma cell is divided into linear plasma chambers by barrier ribs. The plasma chambers are sequentially switched and scanned, and signal voltages are synchronously applied to transparent electrodes opposite to the plasma chambers in such a manner that the liquid crystal layer is interposed. Thus, the liquid crystal layer is operated.

The plasma addressed electro-optical display includes discharge electrodes which are formed by a relatively coarse Ni film formed by printing and baking Ni paste.

When Ni is employed to form the discharge electrodes, the sputtering resistance of the discharge electrodes must be raised. Therefore, a process has been employed in which mercury is diffused in the plasma cell.

On the other hand, terminal electrodes for establishing the connection between the discharge electrodes and an external circuit are made of a material prepared by printing and baking gold or silver paste to improve hermeticity.

As shown in FIG. 1, a discharge electrode 101 and a terminal electrode 102 are connected to each other in a plasma cell surrounded by a frit seal 103. In general, the portion, in which the connection has been established, is covered with a cover glass 104.

When the above-mentioned structure is employed, the terminal electrodes 102, however, easily form amalgams because the terminal electrodes 102 is combined with diffused mercury. Thus, there arises a problem in that mercury diffused in the plasma cell is deprived.

The reason for this lies in that mercury is able to easily reach the terminal electrodes through the discharge electrodes 101 in the form of the coarse Ni film and the cover glass 104 having a small thickness.

When the discharge electrodes 101 and the base glass layer 105 are simultaneously formed on a glass substrate 106 by etching by a sand blast method, the terminal electrode 102 is overlaid on the discharge electrode 101. It leads to a fact that mercury is introduced from upper and lower portions, as indicated with an arrow A or an arrow B shown in FIG. 1. In the above-mentioned case, the problem becomes more critical.

If the terminal electrodes 102 are combined with mercury and therefore mercury diffused in the plasma cell is deprived, the discharge electrodes 101 made of Ni can undesirably easily be sputtered when the discharge electrodes 101 perform discharge. In this case, the lifetime is shortened undesirably. If the discharge electrodes 101 are sputtered, sputtered Ni is allowed to adhere to the thin dielectric plate 107. As a result, the transmissivity of light deteriorates excessively, causing a critical problem for the plasma addressed electro-optical display to arise.

To solve the above-mentioned problem, it might be considered feasible to enlarge the thickness of the cover glass 104. If the cover glass 104 has a large thickness, vapor of mercury cannot pass through the cover glass 104.

In the above-mentioned case, barrier ribs (ribs) 108, however, are easily damaged in the boundary with the cover glass 104. It leads to a fact that a problem arises in that a defective image occurs attributable to leakage of discharge.

OBJECT AND SUMMARY OF THE INVENTION

Accordingly, an object of the present invention is to provide a plasma addressed electro-optical display which is capable of preventing formation of amalgams in the terminal electrodes and therefore elongating the lifetime of the plasma addressed electro-optical display.

To achieve the above-mentioned object, according to one aspect of the present invention, there is provided a plasma addressed electro-optical display including a first substrate having a plurality of discharge electrodes formed thereon; a dielectric layer disposed apart from the first substrate for a predetermined distance; a plasma cell formed by sealing the peripheries of the first substrate and the dielectric layer with a sealing portion; and a second substrate disposed opposite to the dielectric layer and having data electrodes intersecting the discharge electrodes on the surface thereof, wherein the plasma cell and the second substrate are stacked in such a manner that an electro-optical material layer is interposed between the plasma cell and the second substrate so that the plasma addressed electro-optical display is formed, the discharge electrodes are connected to terminal electrodes through connecting electric lines, and the terminal electrodes are drawn out to the outside of the plasma cell, and then connected to a drive circuit.

The plasma addressed electro-optical display according to the present invention may have a structure that the connecting electric lines are made of a material selected from a group consisting of Ni, Cr and Al.

The plasma addressed electro-optical display according to the present invention may have a structure that a plurality barrier ribs are formed between the first substrate and the dielectric layer so that plasma channels are formed.

The plasma addressed electro-optical display according to the present invention may have a structure that a cover glass layer for covering the discharge electrodes and the terminal electrodes is formed in a region between the barrier ribs and the sealing portion.

The plasma addressed electro-optical display according to the present invention may have a structure that portions in which the terminal electrodes and the connecting electric lines are connected to each other are formed below the sealing portion.

The plasma addressed electro-optical display according to the present invention may have a structure that the terminal electrodes are made of a material selected from a group consisting of Ag and Au.

Other objects, features and advantages of the invention will be evident from the following detailed description of the preferred embodiments described in conjunction with the attached drawings.

DETAILED DESCRIPTION OF THE INVENTION

An embodiment of the present invention will now be described with reference to the drawings.

Figure 1:
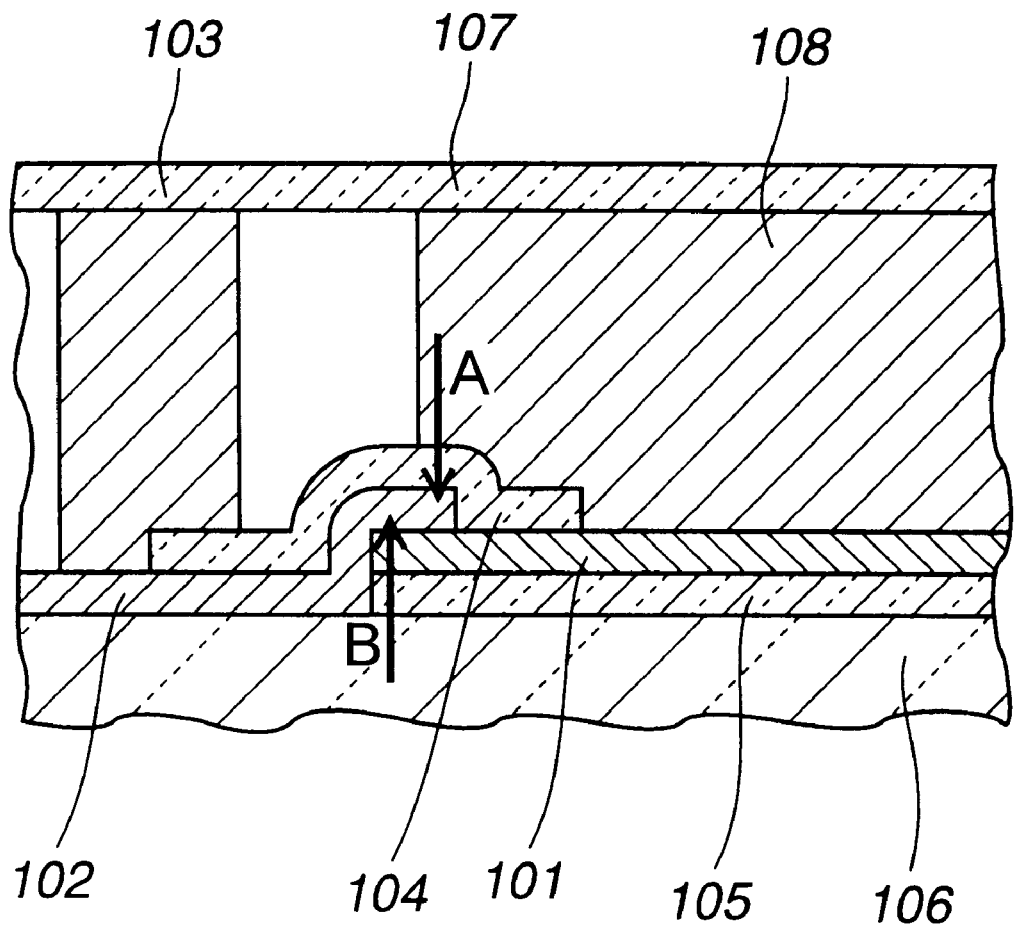
FIG. 1 is a schematic cross sectional view showing an essential portion of the structure of a terminal connection portion of a conventional plasma cell.
Figure 2:
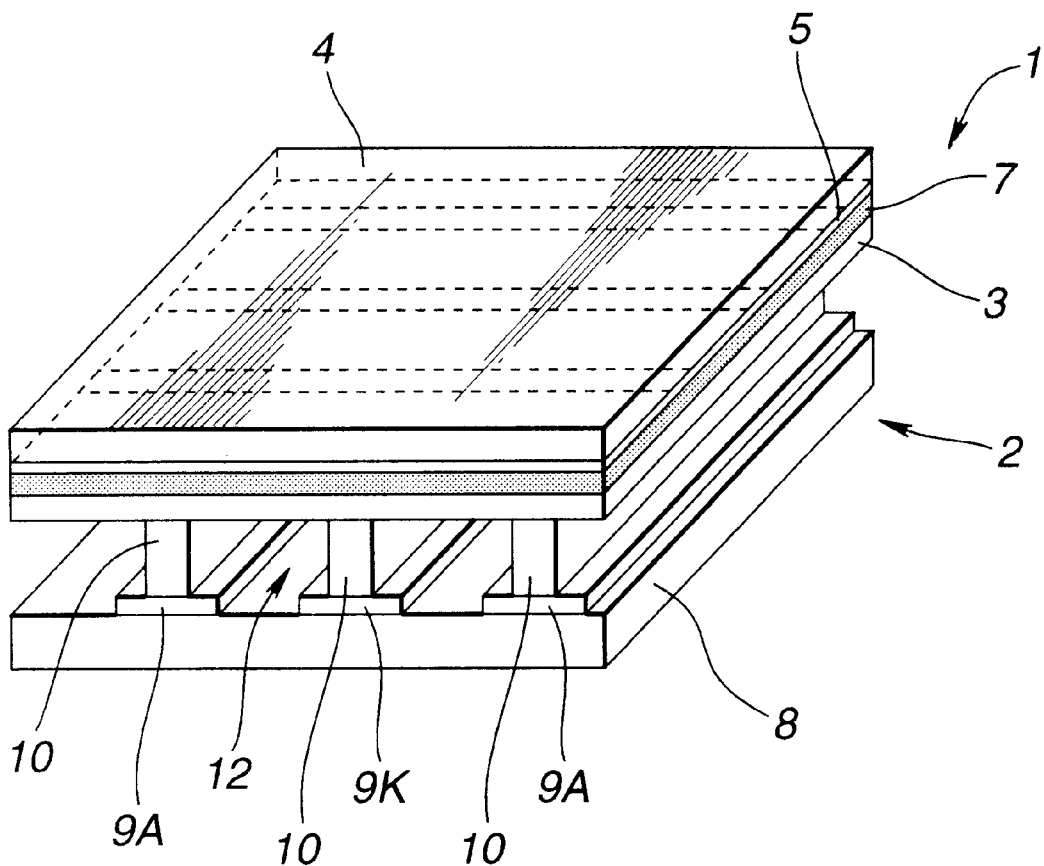
FIG. 2 is a partially-cut schematic perspective view showing the structure of an embodiment of a plasma addressed electro-optical display according to the present invention.
Figure 3:
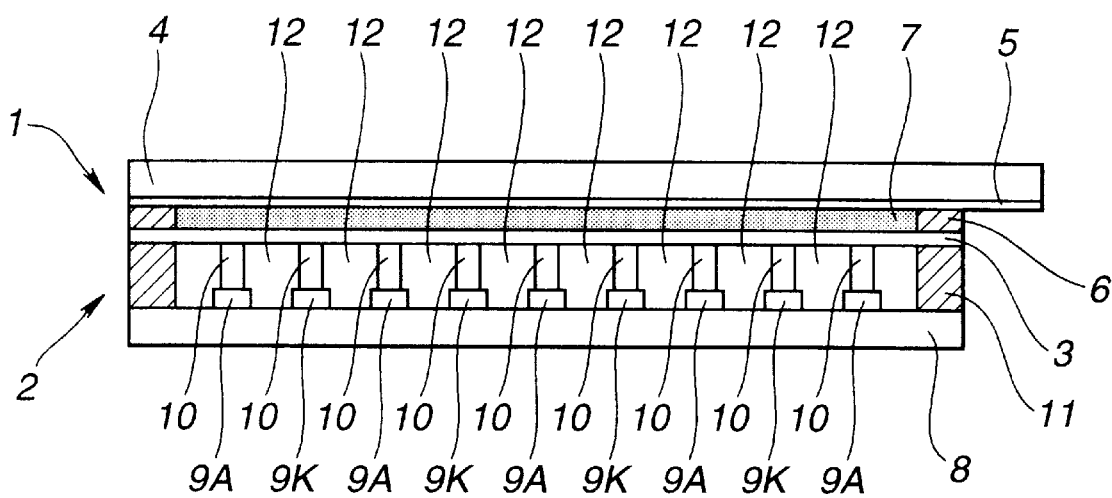
FIG. 3 is a schematic cross sectional view showing the structure of the embodiment of the plasma addressed electro-optical display according to the present invention.

A plasma addressed electro-optical display according to this embodiment has a so-called flat panel structure. The structure is formed into a stacked shape composed of an electro-optical display cell 1, a plasma cell 2 and a dielectric sheet 3, which is interposed between the electro-optical display cell 1 and the plasma cell 2, as shown in FIGS. 2 and 3.

The dielectric sheet 3 is formed by a thin glass plate and the like to serve as a capacitor. Therefore, it is preferable that the thickness of the dielectric sheet 3 is minimized to realize satisfactory electrical coupling between the electro-optical display cell 1 and the plasma cell 2 and to prevent two-dimensional expansion of electrical charges. Specifically, a thin glass plate having a thickness of about 50 $\mu$m is employed.

The electro-optical display cell 1 is manufactured in such a manner that a glass substrate (an upper substrate) 4 having a predetermined distance from the dielectric sheet 3 by virtue of a spacer 6, is joined to the upper surface of the dielectric sheet 3.

A liquid crystal material, which is an electro-optical material, is enclosed in a space between the dielectric sheet 3 and the upper substrate 4. Thus, a liquid crystal layer 7 is formed. Note that the electro-optical material may be a material except for liquid crystal.

The distance from the upper substrate 4 to the dielectric sheet 3 is determined to be, for example, 4 $\mu$m to 10 $\mu$m, which is maintained substantially uniformly over the display surface.

A plurality of data electrodes 5 made of a transparent conductive material and extending, for example, in a direction of the rows, are disposed on the surface of the upper substrate 4 opposite to the dielectric sheet 3. The data electrodes 5 are, at predetermined intervals, formed in parallel with each other in a direction of columns.

The plasma cell 2 is composed of the dielectric sheet 3 and a glass substrate (a lower substrate) 8 disposed below the dielectric sheet 3.

A plurality of anode electrodes 9A and cathode electrodes 9K extending in a direction perpendicular to the direction of the data electrodes 5, that is, in the direction of the columns are disposed on the surface of the lower substrate 8 opposite to the dielectric sheet 3. The anode electrodes 9A and cathode electrodes 9K are formed in parallel with each other and apart from each other for a predetermined distance to form a discharge electrode group.

Moreover, barrier ribs 10 each having a predetermined width and extending along the anode electrodes 9A and the cathode electrodes 9K are formed on the central portions of the upper surfaces of the anode electrodes 9A and the cathode electrodes 9K. The top end of each of the barrier ribs 10 is in contact with the lower surface of the dielectric sheet 3 so that a substantially constant distance is maintained from the lower substrate 8 to the dielectric sheet 3.

The dielectric sheet 3 is hermetically joined to the lower substrate 8 at an outer periphery thereof by a frit seal 11 formed by low melting point glass and the like. Thus, the plasma cell 2 is formed into a hermetically sealed space. The hermetically sealed space is filled with a gas, ionization of which is permitted, for example, helium gas, neon gas, argon gas or their mixture gas.

The plasma addressed electro-optical display according to this embodiment has a plurality of discharge channels (spaces) 12 formed between the lower substrate 8 and the dielectric sheet 3 and separated from one another by the barrier ribs 10. The discharge channels 12 are formed in parallel with one another in the direction of the rows. The discharge channels 12 intersect the data electrodes 5 at right angles.

Figure 4:
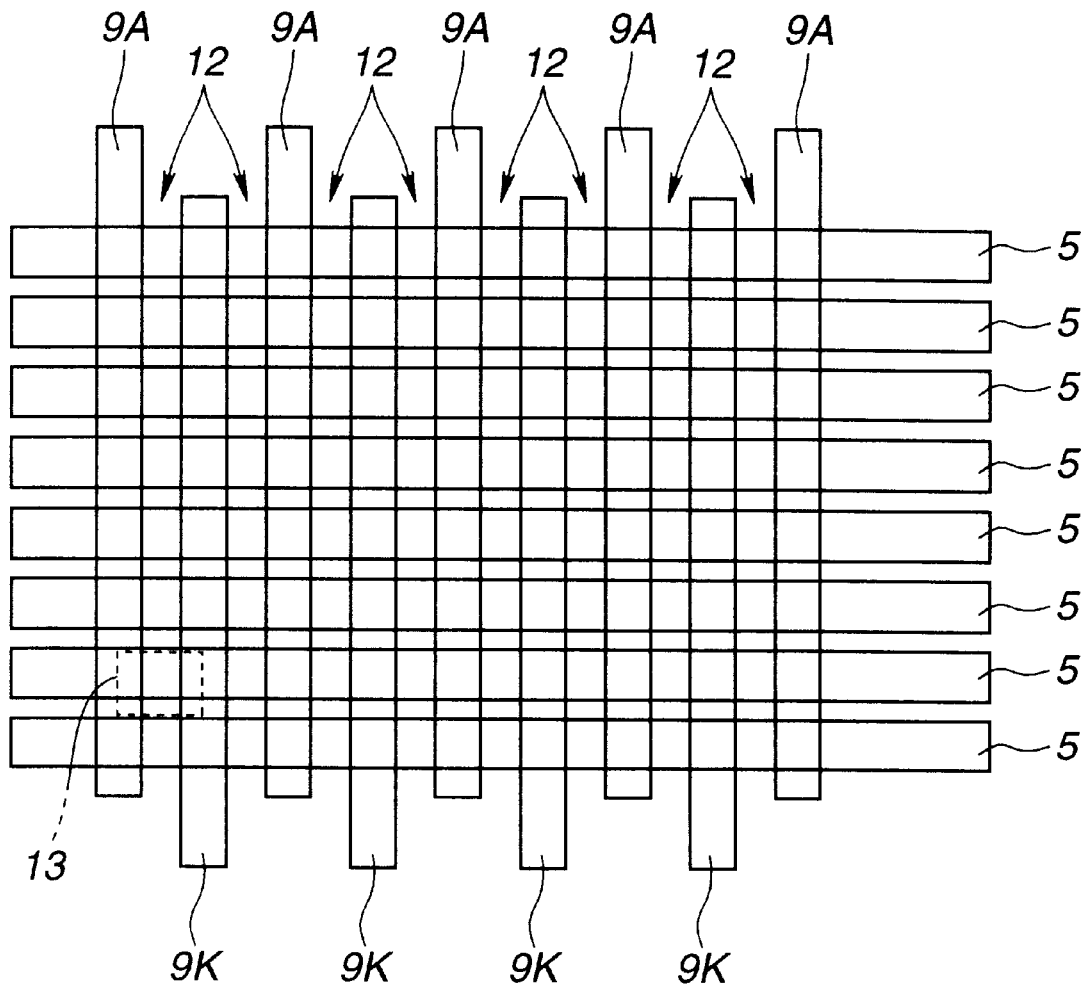
FIG. 4 is a schematic view showing layout of data electrodes, discharge electrodes and discharge channels.

Therefore, each of the data electrodes 5 serves as a unit for operating the column, while each of the discharge channels 12 serves as a unit for operating the row. As shown in FIG. 4, intersections of the data electrodes 5 and the discharge channels 12 correspond to pixels 13.

In the plasma addressed electro-optical display having the above-mentioned structure, when drive voltage is applied between the anode electrodes 9A and cathode electrodes 9K corresponding to predetermined discharge channels 12, the gas enclosed in the discharge channels 12 is ionized. Thus, plasma discharge takes place and the potentials in the discharge channels 12 are kept to the anode potential.

When data voltage is applied to each of the data electrodes 5 in the foregoing state, data voltage is written on the liquid crystal layer 7 corresponding to the plural pixels 13 disposed in the direction of the columns to correspond to the discharge channels 12 in which the plasma discharge has taken place.

After the plasma discharge has been completed, the potentials of the discharge channels 12 are made to be float potentials. Thus, the data voltage written on the liquid crystal layer 7 corresponding to the pixels 13 is maintained to a next writing period (for example, one field or one frame after). In this case, the discharge channels 12 serve as sampling switches and the liquid crystal layer 7 of each of the pixels 13 serves as a sampling capacitor.

Liquid crystal is operated with the data voltage written on the liquid crystal layer 7 so that display is performed at each pixel 13. Therefore, the liquid crystal layer 7 is operated similarly to the active matrix addressing method when the discharge channels 12 which generate plasma discharge are sequentially scanned and data voltage is applied to each of the data electrodes 5 in synchronization with the scanning operations. Thus, two-dimensional display can be performed.

Figure 5:
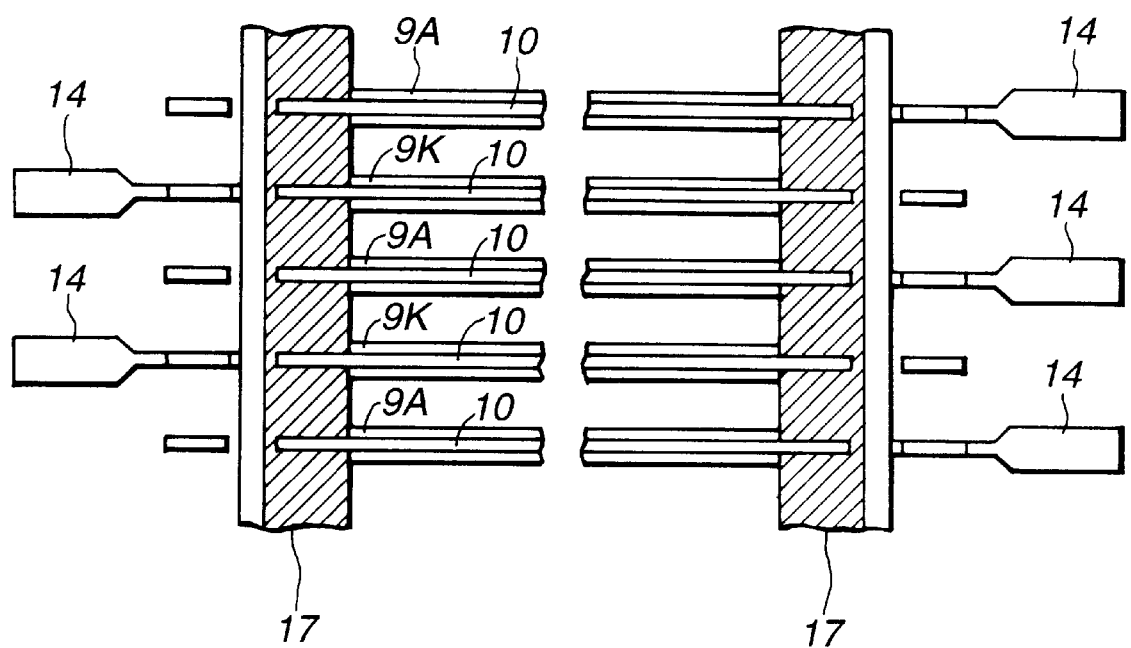
FIG. 5 is a schematic plan view showing layout of discharge electrodes and terminal electrodes.

The plasma addressed electro-optical display has the above-mentioned basic structure. The plasma addressed electro-optical display according to this embodiment must form the terminal electrode 14 into external electrodes as shown in FIG. 5 to establish the connection between the discharge electrodes (the anode electrodes 9A and the cathode electrodes 9K) with an external drive circuit.

Although the terminal electrodes 14 are generally directly connected to the anode electrodes 9A and the cathode electrodes 9K in the plasma cell, indirect connection through connecting electric lines is employed in this embodiment.

Figure 6:
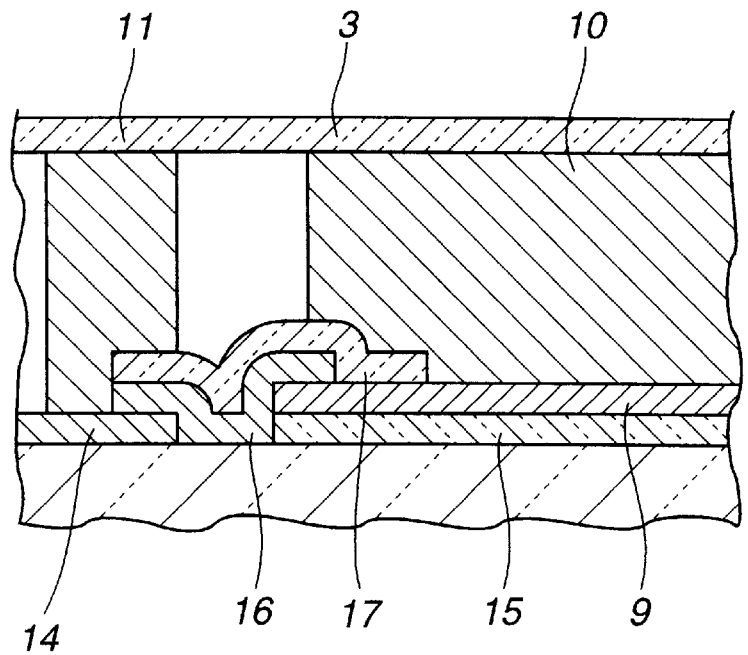
FIG. 6 is a schematic cross sectional view showing an essential portion of terminal electrode connection portions in a plasma cell.

FIG. 6 is an enlarged view of the above-mentioned portion.

The discharge electrodes 9 (the anode electrode 9A or the cathode electrode 9K) are formed into stripe configuration by applying paste containing Ni and by a baking process performed after the applying process. The discharge electrode 9 is in the form of a so-called coarse film.

The discharge electrode 9 is not directly formed on the lower substrate 8. As an alternative to this, the discharge electrode 9 is formed on the lower substrate 8 through a base glass layer 15.

In this embodiment, the discharge electrodes 9 and the base glass layer 15 are simultaneously formed by etching by a sand blast method. Therefore, the discharge electrode 9 and the base glass layer 15 have the same shape.

On the other hand, the terminal electrode 14 is allowed to pass through a portion below the frit seal 11, and then drawn out to the outside of the plasma cell 2. The leading end of the terminal electrode 14 adjacent to the plasma cell is not overlaid on and connected to the discharge electrode 9. As an alternative to this, the leading end of the terminal electrode 14 is connected to the discharge electrode 9 through a connecting electric line 16.

That is, the leading end of the discharge electrode 9 and that of the terminal electrode 14 are apart from each other for a predetermined distance. To establish the connection between the distant leading end of the discharge electrode 9 and that of the terminal electrode 14, the connecting electric line 16 made of a conductive material is formed.

The connecting electric line 16 has two ends which overlap the discharge electrode 9 and the terminal electrode 14, respectively. As a result, the discharge electrode 9 and the terminal electrode 14 are electrically connected to each other.

The barrier ribs 10 which are formed on the discharge electrode 9 must be formed slightly apart from the frit seal 11. Cover glass 17 is formed to cover the discharge electrodes in the above-mentioned regions. The regions, in which the cover glass 17 is formed, are diagonal regions shown in FIG. 5.

The terminal electrode 14 is manufactured by applying paste made of gold (Au) or silver (Ag) after which baking is performed to improve the adherence with the frit seal 11. It is preferable that the paste be gold paste because of no fear of migration.

When gold paste having a shrinkage ratio of 25% or higher in a baked state is used, solubility of mercury can be restrained to a low level. Thus, appearance of amalgams can furthermore effectively be prevented. The shrinkage ratio of the gold paste can be obtained by making a comparison of the film thicknesses changed attributable to the baking process. Specifically, the shrinkage ratio can be calculated by the following Equation (1):

$$\text{Shrinkage Ratio} = \frac{\begin{array}{c}\text{Dry Thickness}\\\text{of Gold Paste}\end{array} - \begin{array}{c}\text{Thickness Realized}\\\text{After Baking Process}\end{array}}{\text{Dry Thickness of Gold Paste}} \quad (1)$$

On the other hand, the connecting electric line 16 may be made of a conductive material that is metal which does not form amalgams with mercury and which permits ohmic contact with the discharge electrode 9 and the terminal electrode 14 to be established.

To prevent cracks in the cover glass 17, it is preferable that the connecting electric line 16 be formed by paste, the shrinkage ratio of which is 30% or lower when the paste is baked.

The portion in which the connecting electric line 16 is overlaid on the discharge electrodes 9 has a tendency that the thickness of the cover glass 17 is reduced. If the baked connecting electric line 16 is shrunk and thus stress is applied, cracks will easily be formed in the cover glass 17. If cracks are formed in the cover glass 17, abnormal discharge takes place between adjacent cathodes through the cracks. Therefore, it is preferable that the shrinkage ratio of the paste for forming the connecting electric line 16 is 30% or lower.

Materials which satisfy the above-mentioned requirements are exemplified by Ni, Cr and Al. In a viewpoint of relatively easily preventing problems caused from heat because of a low resistance value, it is preferable that Ni or Al be employed. When Al is employed, whether or not ohmic contact can be established with the terminal electrode must be examined. It is preferable that the material of the terminal electrode be gold.

The cover glass 17 is generally made of amorphous glass with which hermetical sealing can easily be performed. If the amorphous glass is employed, reactions sometimes take place in the junction of the electrode. In this case, a problem of an abnormal resistance value and/or heat generation during discharge which causes disconnection to take place.

To prevent the above-mentioned problems, crystallized glass may be employed. Although the baking temperature and the like of the crystallized glass must severely be controlled, crystallized glass is superior to amorphous glass in a viewpoint of preventing reactions in the junction of the electrode.

Since the terminal electrode 14 is disposed in the lowermost layer as described above, undesirable upward introduction of mercury can perfectly be prevented by the lower substrate 8 which is the glass substrate.

Moreover, the leading end (the portion in which the terminal electrode 14 and the connecting electric line 16 are connected to each other) is placed below the frit seal 11. Thus, the terminal electrode 14 is not substantially introduced into the plasma cell 2. Therefore, amalgams can be reduced.

Although the above-mentioned embodiment has the structure that the discharge electrodes 9 and the base glass layer 15 are simultaneously patterned by the sand blast method, the discharge electrodes 9 and the base glass layer 15 may individually be patterned. The discharge electrodes 9 and the base glass layer 15 may be formed into a stripe configuration by a printing method.

Figure 7:
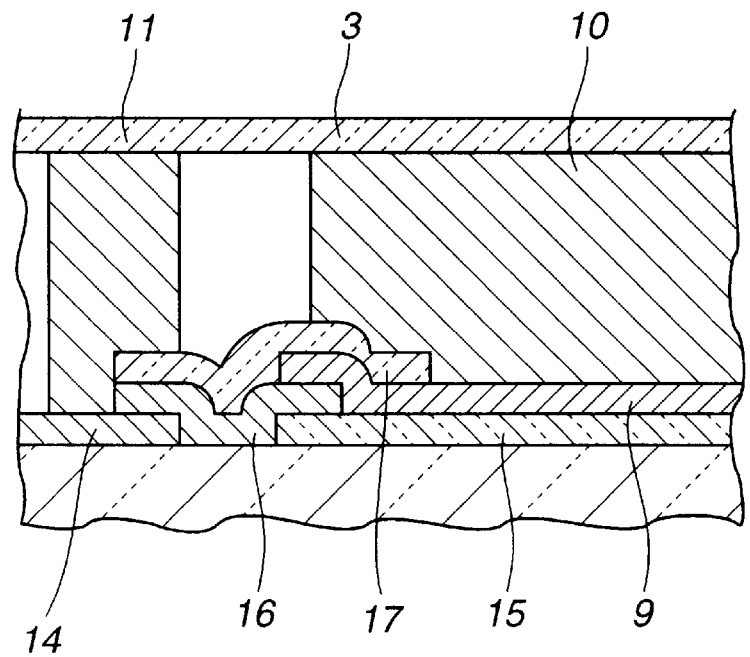
FIG. 7 is a schematic cross sectional view showing an essential portion of another example of the terminal electrode connection portions in a plasma cell.

In the above-mentioned case, the connecting electric line 16 is introduced between the discharge electrode 9 and the base glass layer 15 as shown in FIG. 7. In this case, an effect similar to that obtainable from the above-mentioned embodiment effect can be expected.

As described above, according to the present invention, formation of amalgams in the terminal electrode can be prevented. Thus, the lifetime of the plasma addressed electro-optical display can be elongated.

Since a large thickness of the cover glass is not required, damage of the barrier ribs in the edge portions of the cover glass can be prevented.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A plasma addressed electro-optical display comprising:
   a first substrate having a plurality of discharge electrodes formed thereon;
   a dielectric layer disposed apart from said first substrate for a predetermined distance;
   a plasma cell formed by sealing the peripheries of said first substrate and said dielectric layer with a sealing portion; and
   a second substrate disposed opposite to said dielectric layer and having data electrodes intersecting said discharge electrodes on the surface thereof, wherein
   said plasma cell and said second substrate are stacked in such a manner that an electro-optical material layer is interposed between said plasma cell and said second substrate so that said plasma addressed electro-optical display is formed, said discharge electrodes are connected to terminal electrodes through connecting electric lines, and said terminal electrodes are drawn out to the outside of said plasma cell, and then connected to a drive circuit.

2. A plasma addressed electro-optical display according to claim 1, wherein said connecting electric lines are made of a material selected from a group consisting of Ni, Cr and Al.

3. A plasma addressed electro-optical display according to claim 1, wherein a plurality of barrier ribs are formed between said first substrate and said dielectric layer so that plasma channels are formed.

4. A plasma addressed electro-optical display according to claim 3, wherein a cover glass layer for covering said discharge electrodes and said terminal electrodes is formed in a region between said barrier ribs and said sealing portion.

5. A plasma addressed electro-optical display according to claim 1, wherein portions in which said terminal electrodes and said connecting electric lines are connected to each other are formed below said sealing portion.

6. A plasma addressed electro-optical display according to claim 1, wherein said terminal electrodes are made of a material selected from a group consisting of Ag and Au.

* * * * *